(12) United States Patent
Ito et al.

(10) Patent No.: US 6,710,792 B1
(45) Date of Patent: Mar. 23, 2004

(54) MULTIBEAM SCANNER

(75) Inventors: Koji Ito, Motosu-gun (JP); Ryota Kato, Nagoya (JP); Yutaka Hattori, Kuwana (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 570 days.

(21) Appl. No.: 09/697,144

(22) Filed: Oct. 27, 2000

(30) Foreign Application Priority Data

Oct. 29, 1999 (JP) .............................. 11-309187

(51) Int. Cl.⁷ .............................. B41J 2/44; B41J 2/447; B41J 2/45; B41J 2/455
(52) U.S. Cl. ....................... 347/233; 347/133; 347/132
(58) Field of Search ................. 347/114, 132, 347/133, 233, 234, 248

(56) References Cited

U.S. PATENT DOCUMENTS

| | | | | |
|---|---|---|---|---|
| 4,835,545 A | * | 5/1989 | Mager et al. ............... | 347/253 |
| 5,311,216 A | * | 5/1994 | Hirahata et al. ............ | 347/132 |
| 5,729,277 A | * | 3/1998 | Morrison .................... | 347/248 |
| 6,275,248 B1 | * | 8/2001 | Nakamura et al. .......... | 347/232 |
| 6,504,147 B1 | * | 1/2003 | Ito et al. .................... | 250/234 |

FOREIGN PATENT DOCUMENTS

| | | | |
|---|---|---|---|
| JP | 2-575849 | 11/1996 | |
| JP | 09-323442 | * 12/1997 | ............. B41J/2/44 |
| JP | 2001-260412 | * 9/2001 | ............. B41J/2/44 |

* cited by examiner

*Primary Examiner*—Huan Tran
(74) *Attorney, Agent, or Firm*—Oliff & Berridge, PLC

(57) ABSTRACT

In a multibeam scanner, a control unit includes a velocity detecting circuit detecting a conveying velocity V of a photosensitive body; a comparison circuit comparing the detected conveying velocity V to a reference conveying velocity $V_0$; a light intensity control circuit 93, a modulation circuit 94, an LD1 control circuit 95, and an LD2 control circuit 96. The LD1 control circuit 95 and LD2 control circuit 96 issue drive signals to laser diodes LD1 and LD2. The laser diodes LD1 and LD2 emit laser beams LB1 and LB2 that are modulated according to image signals outputted from the modulation circuit 94. The laser beams LB1 and LB2 are deflected by a polygon mirror onto the photosensitive body and perform a main scan over neighboring scanning lines SL1 and SL2, while the photosensitive drum is rotated. The light intensity from the laser diode LD1 is adjusted when the velocity of the photosensitive drum differs from a prescribed velocity in order to achieve a balanced image density.

15 Claims, 12 Drawing Sheets

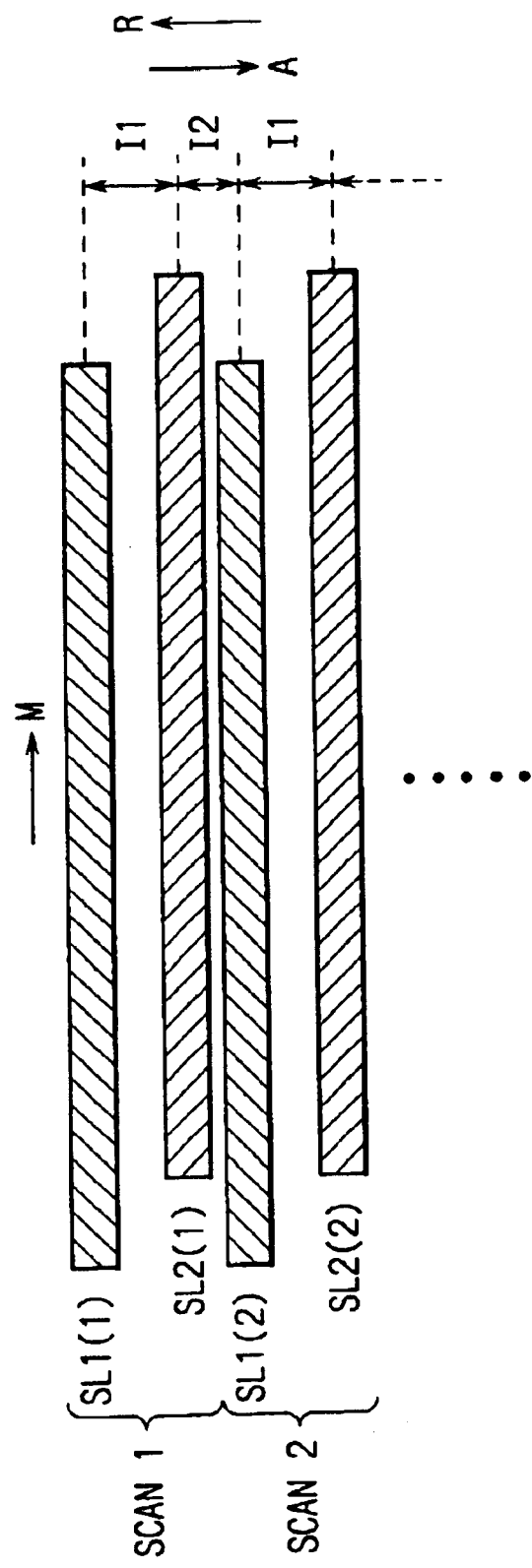

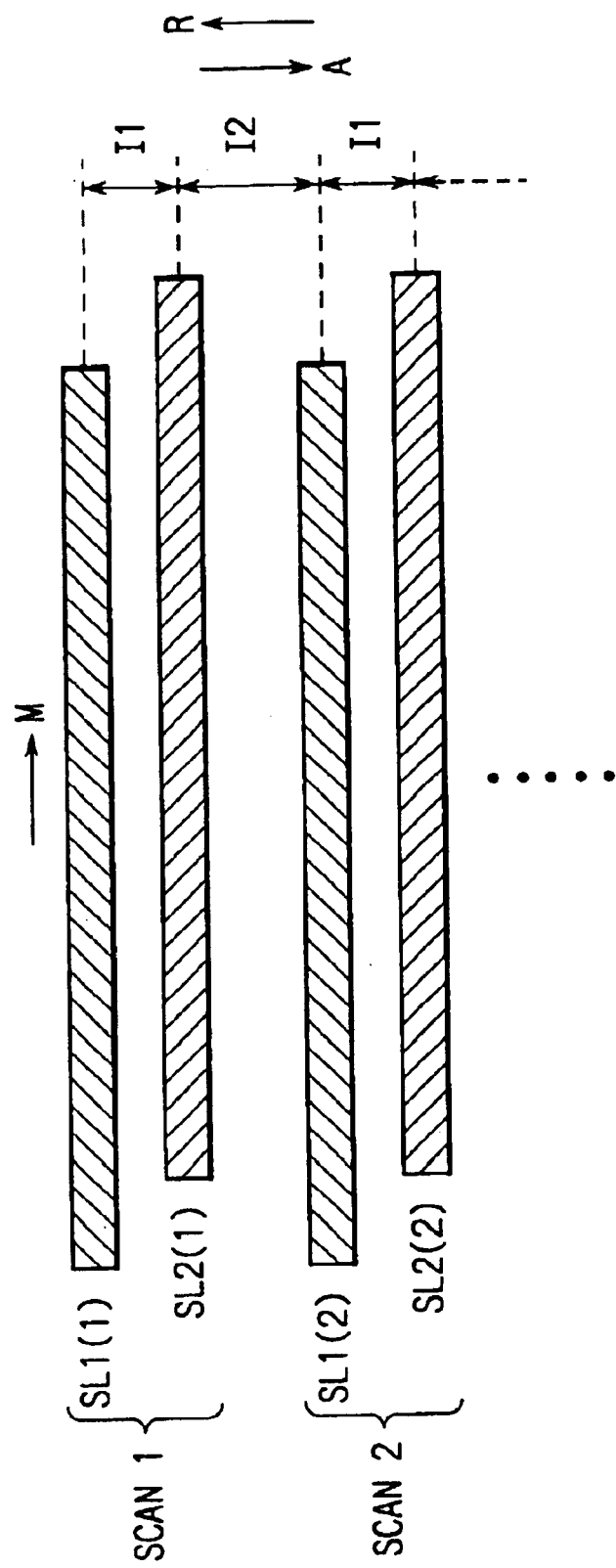

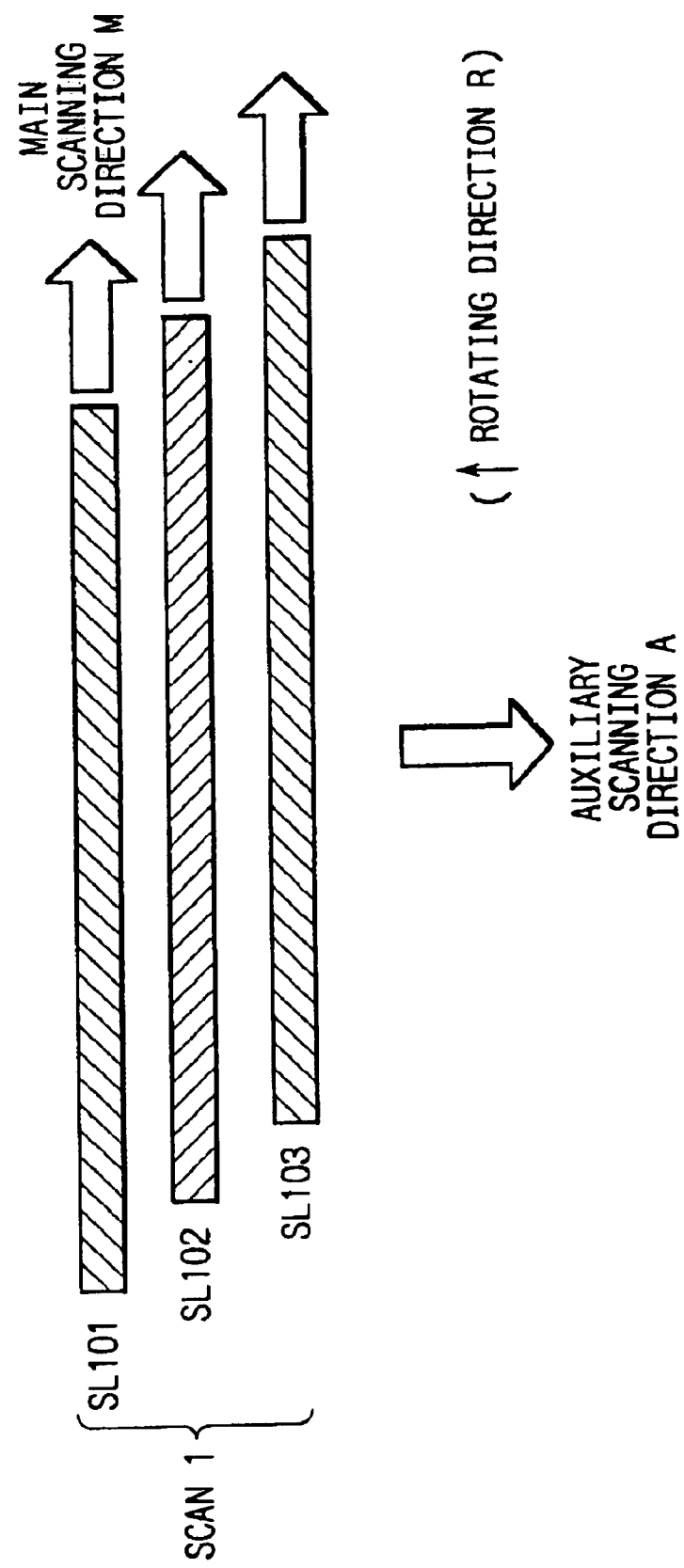

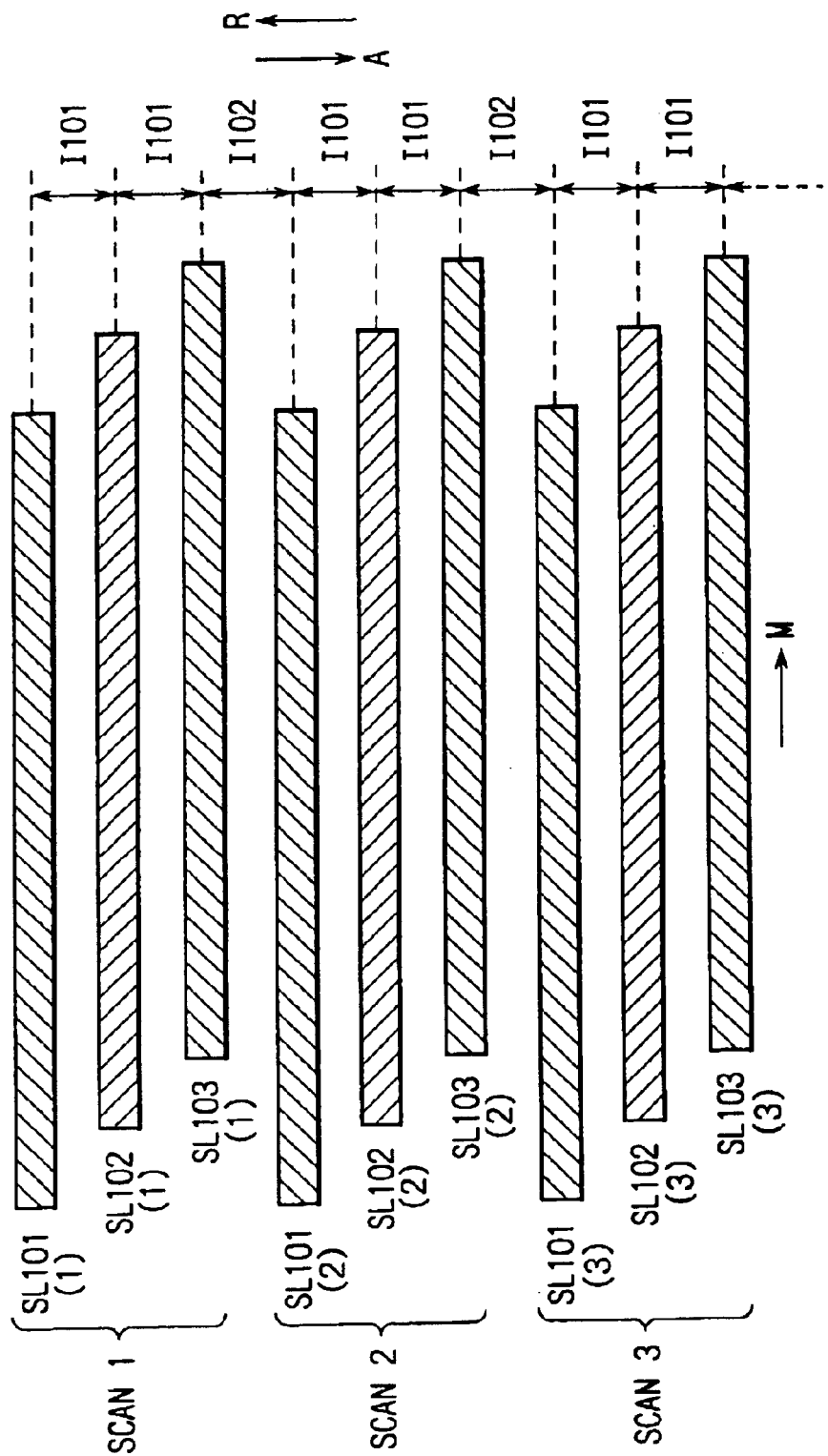

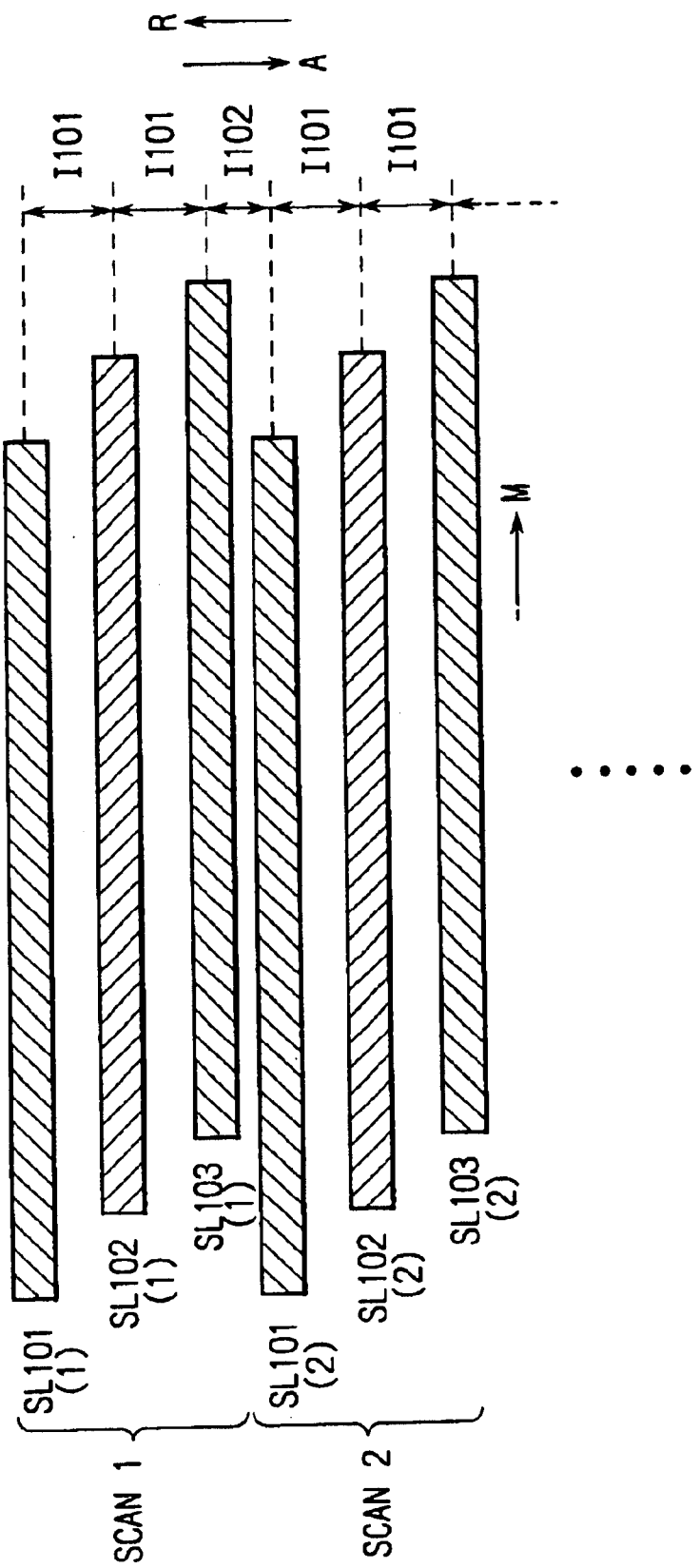

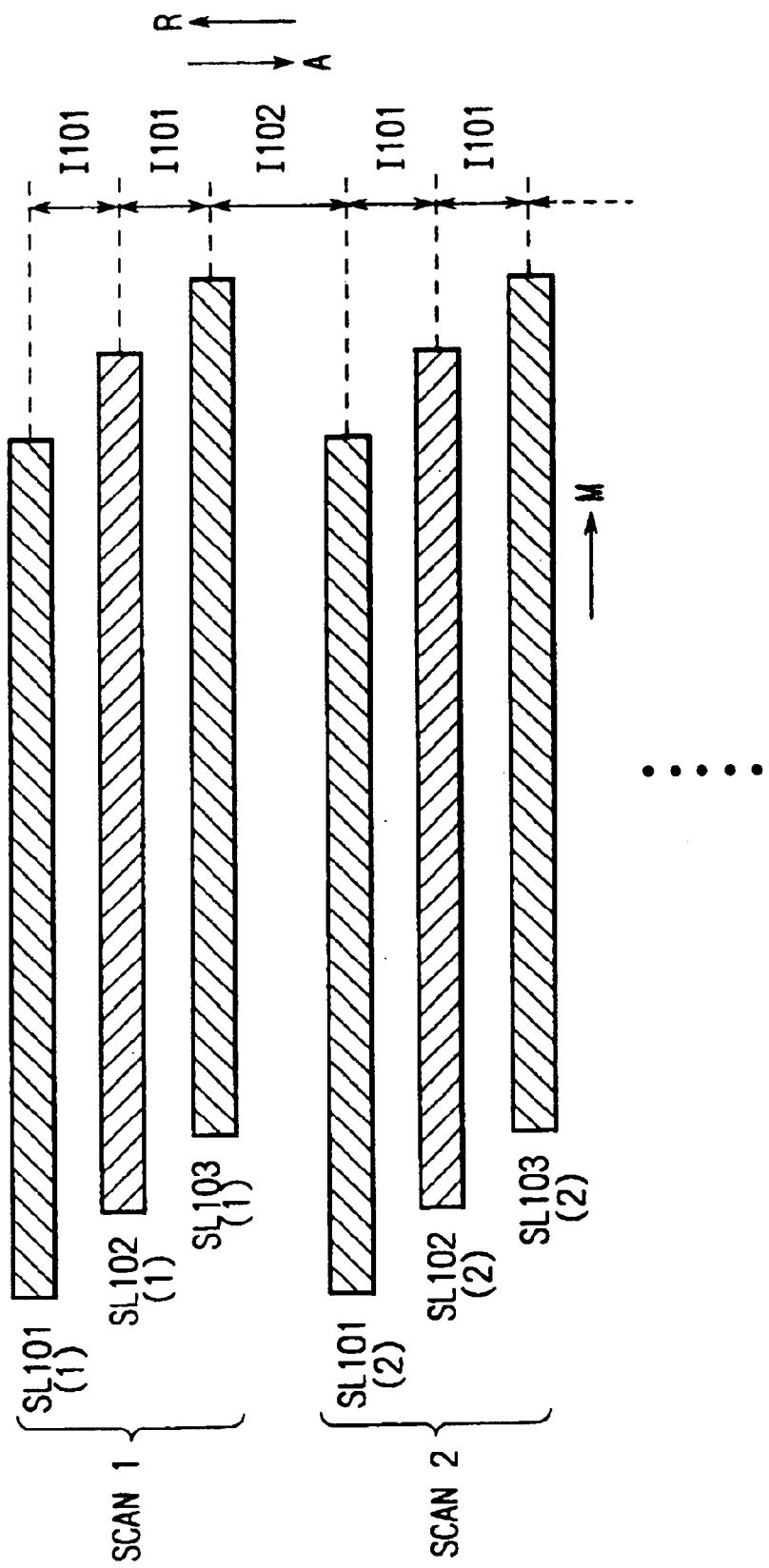

MULTIBEAM SCANNER

BACKGROUND OF THE INVENTION

1. Field of the Invention

The present invention relates to a multibeam scanner.

2. Description of Related Art

Beam scanners used in laser beam printers and the like use a polygon mirror or the like to deflect an optical beam that is modulated according to image signals, thereby scanning a photosensitive material in a main scanning direction, while moving the photosensitive material in an auxiliary scanning direction to expose the photosensitive material to form an image thereon.

In recent years, a multibeam scanner has been proposed for performing main scans over a plurality of scanning lines simultaneously using a plurality of laser beams to irradiate the photosensitive material. By scanning a plurality of scanning lines in the main scanning direction simultaneously, this multibeam scanner can expose a photosensitive material in a shorter time than scanners using only one laser beam. Further, since the laser beams that scan the photosensitive material simultaneously are maintained at fixed intervals or distances in relation to one another, irregular intervals between beams is less likely to occur.

The scanning velocity in the auxiliary scanning direction can deviate. When the interval between scanning lines becomes narrower, the image density or print density increases. When the interval becomes wider, the image density decreases.

Japanese Patent No. 2575849 has proposed an image exposing apparatus which combines three different color beams together into a single light beam and then scans the single light beam onto a recording material. The recording material is scanned simultaneously by the single light beam only. According to this publication, an encoder is provided to detect an irregular conveying speed of the recording material in the auxiliary scanning direction. When the encoder detects such irregularity in the conveying speed, the overall exposure amount is regulated in order to correct irregularities in image density that is caused by the irregular conveying speed. That is, the exposure amounts of light beams in all the colors are adjusted dependently on the results detected by the encoder.

SUMMARY OF THE INVENTION

When speed variations in the auxiliary scanning direction occur in multibeam scanners, however, some intervals are varied by the change in velocity, but some other intervals between scanning lines are fixed. Therefore, changing the exposure amount in all of the laser beams will loss the exposure balance, preventing the formation of a detailed image with a balanced image density.

In view of the above-described drawbacks, it is an object of the present invention to provide an improved multibeam scanner that is capable of exposing a detailed image at a high rate of speed and without density irregularities by appropriately adjusting the exposure amount in the scanning lines.

In order to attain the above and other objects, the present invention provides a multibeam scanning device, comprising: a photosensitive medium moving unit moving a photosensitive medium in a predetermined moving direction, an auxiliary scanning direction being defined as a direction opposite to the predetermined moving direction; a light beam unit that emits a plurality of light beams; a beam deflecting unit deflecting the plurality of light beams, which are modulated according to image signals, to simultaneously scan the plurality of light beams on a corresponding plurality of scanning lines that extend along a predetermined main scanning direction on the photosensitive medium, while the photosensitive medium moves in the predetermined moving direction, thereby exposing a corresponding image on the photosensitive medium, the main scanning direction being substantially orthogonal to the moving direction, the plurality of scanning lines being arranged adjacent to one another in the auxiliary scanning direction; a movement velocity detector detecting the movement velocity of the photosensitive medium along the predetermined moving direction; and a light intensity control unit controlling the light beam unit to adjust the intensity of a part of the plurality of light beams based on the detected moving velocity of the photosensitive medium.

The light intensity control unit may control the light beam unit to adjust, based on the detected moving velocity of the photosensitive medium, the intensity of at least one of two light beams in the plurality of light beams, the two light beams including a first light beam and a second light beam, the first light beam being scanned in a first scanning line that is located in a most upstream side of the plurality of scanning lines along the auxiliary scanning direction, the second light beam being scanned in a second scanning line that is located in a most downstream side of the plurality of scanning lines along the auxiliary scanning direction.

The beam deflecting unit may deflect the plurality of light beams in the main scanning direction repeatedly to form a successive sets of plural scanning lines while the photosensitive medium moving unit moves the photosensitive medium in the predetermined moving direction, thereby forming the successive sets of scanning lines to be arranged in the auxiliary scanning direction. The light intensity control unit may control the light beam unit to adjust, based on the detected moving velocity of the photosensitive medium, the intensity of at least one of the first and second light beams, the first light beam forming, in each set, a first scanning line that is located adjacent to a scanning line in a preceding set of scanning lines, the second light beam forming, in each set, a second scanning line is that located adjacent to a scanning line in a subsequent set of scanning lines.

The light intensity control unit may include: a velocity comparing unit comparing the detected velocity with a predetermined reference velocity; and an intensity changing unit that changes the intensity of at least one of the first and second light beams based on the compared result. The light beam unit initially may emit each of the plurality of light beams at a predetermined intensity. The intensity changing unit may change the intensity of the at least one light beam from the predetermined intensity when the compared result shows that the moving velocity of the photosensitive medium is different from the predetermined reference velocity. For example, the intensity changing unit may increase the intensity of the at least one light beam from the predetermined intensity when the compared result shows that the moving velocity of the photosensitive medium is greater than the predetermined reference velocity. The intensity changing unit may decrease the intensity of the at least one light beam from the predetermined intensity when the compared result shows that the moving velocity of the photosensitive medium is smaller than the predetermined reference velocity.

BRIEF DESCRIPTION OF THE DRAWINGS

The above and other objects, features and advantages of the invention will become more apparent from reading the following description of the preferred embodiments taken in connection with the accompanying drawings in which:

FIG. 7 is an explanatory diagram showing that lines SL exposed when the auxiliary scanning velocity is slower than a predetermined reference velocity in relation to the main scanning velocity;

FIG. 8 is an explanatory diagram showing scanning lines SL exposed when the auxiliary scanning velocity is faster than the predetermined reference velocity in relation to the main scanning velocity;

FIG. 9 is an explanatory diagram showing three scanning lines SL101, SL102, and SL103 that are formed simultaneously on the photosensitive drum by three laser beams projected from three laser diodes, according to a first variation;

FIG. 10 is an explanatory diagram showing that successive series of main scanning lines are produced along the auxiliary scanning direction while the photosensitive drum rotates, each set of main scanning lines being formed simultaneously by the three laser beams;

FIG. 11 is an explanatory diagram showing scanning lines SL exposed when the auxiliary scanning velocity is slower than the prescribed reference velocity in relation to the main scanning velocity; and FIG. 12 is an explanatory diagram showing scanning lines SL exposed when the auxiliary scanning velocity is faster than the prescribed reference velocity in relation to the main scanning velocity.

DETAILED DESCRIPTION OF THE PREFERRED EMBODIMENT

Figure 1:
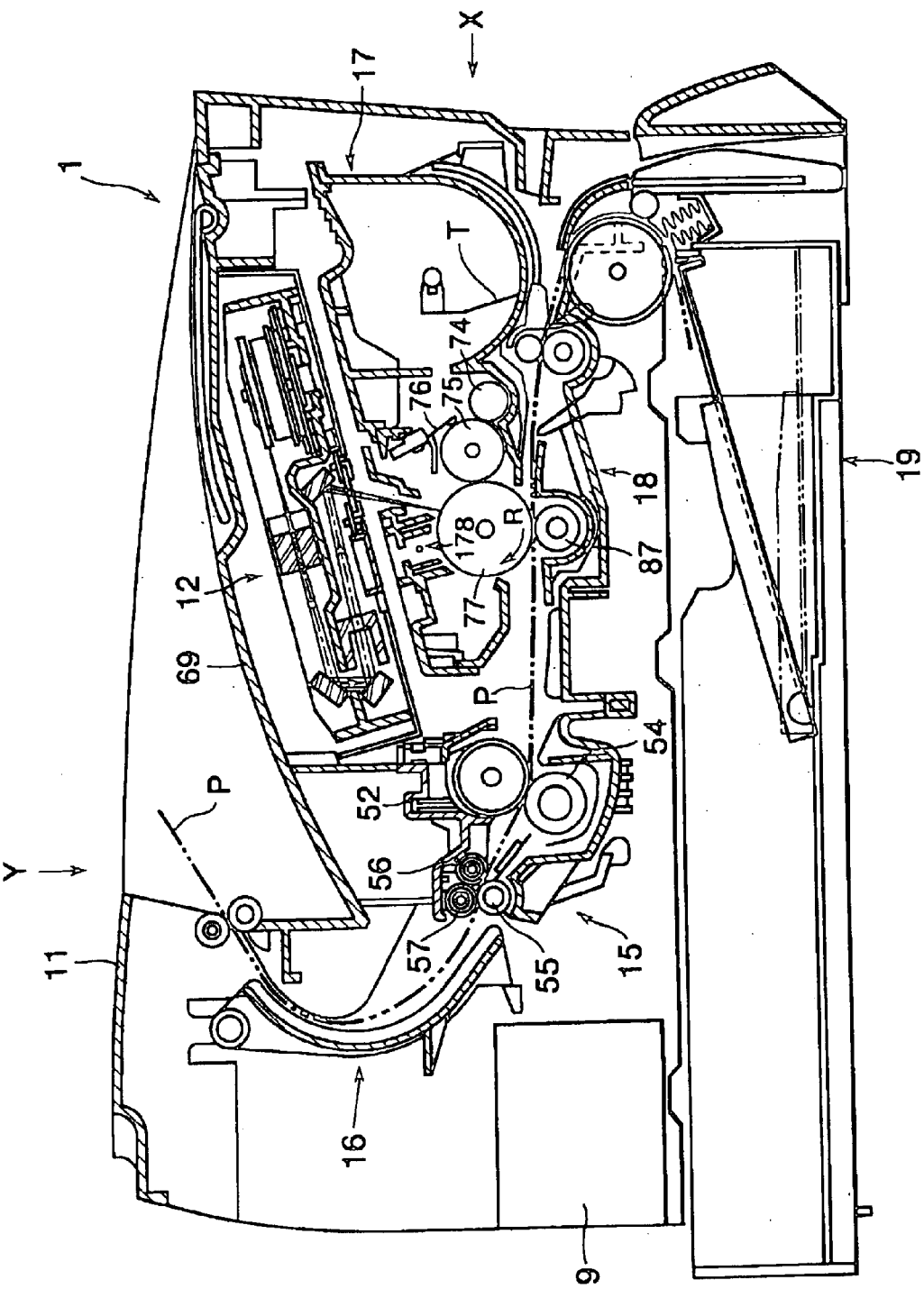
FIG. 1 is a side cross-sectional view of a laser printer from a direction orthogonal to the paper conveying direction.

A multibeam scanning device according to a preferred embodiment of the present invention will be described while referring to the accompanying drawings wherein like parts and components are designated by the same reference numerals to avoid duplicating description.

FIG. 1 shows a laser printer 1 which is provided with a multibeam scanner 12 according to the embodiment of the present invention. The multibeam scanner 12 of this embodiment is a laser scanner.

First, the overall structure of the laser printer 1 will be described with reference to FIG. 1.

As shown in FIG. 1, the laser printer 1 has a main frame 11. By this main frame, the overall shape of the laser printer 1 is formed approximately like a rectangular parallelepiped.

In the drawing, the right side is the front of the laser printer 1, and the left side is the rear side of the laser printer 1.

A paper supply unit 19 is provided in the bottom of the main frame 11. The paper supply unit 19 includes a sheet feed cassette which stores and feeds sheets of papers P. One sheet of paper P is fed out from the paper supply unit 19 at a time of the front side of the laser printer 1. A conveying unit 18 is provided to convey the sheet of paper P from the front side of the laser printer 1 in a direction toward the rear side of the apparatus 1. A developing unit 17 is integrally formed as a processing unit, and is disposed on top of the conveying unit 18. The multibeam scanner 12 of the present embodiment is disposed on top of the developing unit 17.

The developing unit 17 includes a photosensitive drum 77, an electric charger 178, a developing roller 75, and a transfer roller 87. The electric charger 178 is for electrically charging the surface of the photosensitive drum 77 uniformly. In this example, the electric charger 178 is a scorotron charger. The multibeam scanner 12 serves to modulate two laser beams LB1 and LB2 (FIG. 2) according to image signals and to radiate the modulated two laser beams onto the photosensitive drum 77, thereby scanning the photosensitive drum 77 to form a corresponding latent image. The developing roller 75 is for conveying toner T for developing the latent image on the photosensitive drum 77. The transfer roller 87 is for transferring the developed toner image onto the paper P which is being conveyed by the conveying unit 18.

A fixing unit 15 is disposed downstream side of the developing unit 17 in the sheet conveying direction. The conveying unit 18 further conveys the paper P to the fixing unit 15 after the toner image has been transferred onto the sheet of paper P. The fixing unit 15 is integrally configured as one unit for providing heat and pressure to the paper P to fix the toner T onto the same.

A discharge unit 16 is provided to discharge the paper P, that has been subjected to the fixing process, onto a paper supporting unit 69 that is provided on top of the laser printer 1. The discharge unit 16 is capable of switching the direction of discharge.

A control unit 9 is further provided in the laser printer 1 that controls the entire apparatus 1 and that also controls the laser scanner 12 of the present embodiment.

Each element in the laser printer 1 will be described below in greater detail.

In the developing unit 17, the photosensitive drum 77 is mounted rotatable about its axis in a predetermined rotating direction R indicated by an arrow in the drawing. The electric charger 178 is disposed above the photosensitive drum 77. The developing roller 75 is disposed on the front side of the photosensitive drum 77. The developing roller 75 is located in contact with the photosensitive drum 77 and rotating in a direction opposite to that of the photosensitive drum 77.

A supply roller 74 is provided on the front side of the developing roller 75. The supply roller 74 rotates in the same direction as the developing roller 75. The supply roller 74 is contacting the developing roller 75 with pressure. The supply roller 74 has a sponge surface (not shown) that deposits fine granules of toner T onto the developing roller 75.

A layer thickness regulating blade 76 is provided in contact with the developing roller 75 with a prescribed pressure to regulate the amount of toner T deposited on the developing roller 75 at a proper and uniform level, scraping off excessive amounts of toner T.

According to the present embodiment, the electric charger 178 is a scorotron charger. More specifically, the electric charger 178 includes a charging wire. The charging wire is formed of a tungsten wire, known as a corona wire, having a diameter in the range of 50–100 μm. The charging wire is deposed parallel to and separated approximately 10 mm from the photosensitive drum 77. The electric charger 178 further includes a shield electrode surrounding the charging wire. The shield electrode is made of aluminum and is formed with a slit opening at a location opposing the photosensitive drum 77. The slit opening extends approximately parallel with the rotational axis of the photosensitive drum 77. A grid electrode is provided over the slit opening. The grid electrode is made of several wires or a mesh, and is electrically insulated from the shield electrode.

The charging wire is electrically connected to a terminal, of a positive polarity, on a power source (not shown). The charging wire is supplied with a high voltage in the range of 5–10 kV from the power source. As a result, ions in positive polarity are generated from the charging wire, and migrate to the surface of the photosensitive drum 77 to electrically charge the same. The grid electrode is supplied with a bias voltage to regulate the charge potential of the photosensitive drum 77. The charge can be controlled by varying the voltage of the charging wire. Hence, the electric charger 178 applies a positive charge to the surface of the photosensitive drum 77.

It is noted that the electric charger 178 can be of a corotron type that has no grid electrode. The electric charger 178 may be constructed from other types of electric charger that generate corona discharge to electrically charge the photosensitive drum 77. For example, the charger 178 may be constructed from a brush-type charger.

Figure 2:
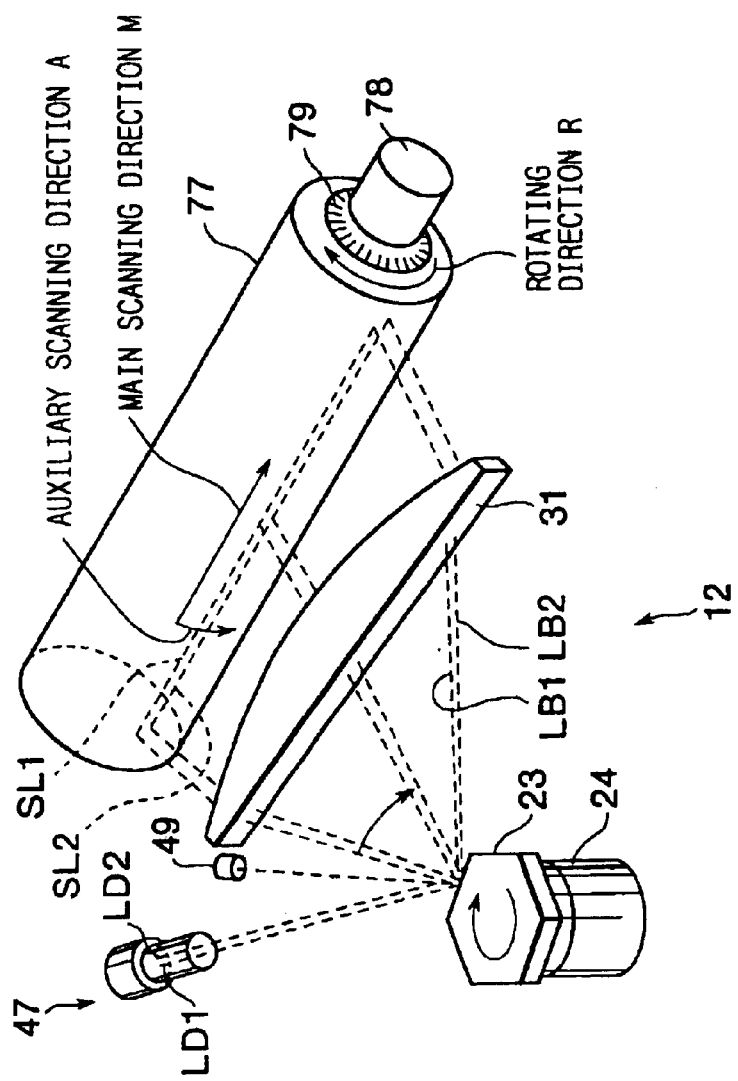
FIG. 2 is an explanatory diagram showing the general construction of a laser scanner provided in the laser printer of FIG. 1.

The electrically-charged areas on the surface of the photosensitive drum 77 moves along with the rotation of the photosensitive drum 77. As shown in FIG. 2, the photosensitive drum 77 rotates in the predetermined rotation direction R indicated by the arrow in the drawing. A direction opposite to this rotating direction R will be referred to as an auxiliary scanning direction A hereinafter. Thus, the electrically-charged areas of the photosensitive drum 77 move in the predetermined rotating direction R, while the laser beams LB1 and LB2 from the laser scanner 12 move in a main scanning direction M to irradiate the charged areas. The main scanning direction M is approximately orthogonal or perpendicular to the predetermined rotating direction R, that is, to the auxiliary scanning direction A.

It is noted that the entire processing unit 17 is changed with a new one when toner T is used up. The photosensitive drum 77 is therefore changed with a new one together with the processing unit 17. According to the present embodiment, therefore, the photosensitive material provided on the outer surface of the photosensitive drum 77 can be made from an organic photoconductor (OPC) even though the organic photoconductor has relatively low durability. Because the photosensitive material on the photosensitive drum 77 is made from the organic photoconductor, the photosensitive drum 77 can be made lightweight and relatively inexpensive.

When the laser beams LB1 and LB2 radiate on the surface of the photosensitive drum 77, the conductivity on the surface increases, and the electrically-charged potential drops. As a result, latent images are formed on the photosensitive drum 77 due to the difference generated in the electric potential.

It is noted that the photosensitive material of the photosensitive drum 77 may be made from other material, such as amorphous silicon aSi which has durable photoconductivity and which is capable of being exposed at a high rate of speed. The photosensitive material may also be made from a selenium type photosensitive material, such as selenium or a selenium alloy. The photosensitive material may be made from cadmium sulfide or the like.

As shown in FIG. 1, as the photosensitive drum 77 rotates, the surface area, on which a latent image is formed, contacts the developing roller 75. The surface of the developing roller 75 is deposited with toner T. The developing roller 75 is a rubber roller having a stainless steel shaft surrounded with a silicone rubber or urethane rubber dispersed with carbon black for conductivity. The surface of the roller is located with a fluorine containing resin. The toner T deposited on the developing roller 75 is therefore frictionally charged into a positive polarity by the supply roller 74 and also by the layer thickness regulating blade 76.

When the developing roller 75 contacts the photosensitive drum 77, the toner T deposits on the area on the photosensitive drum 77 that has a lower charged voltage due to being irradiated by the laser beams LB1 and LB2. As a result, the toner T develops the latent image into a visible toner, completing the developing process. Simultaneously, residual toner T on the photosensitive drum 77 is recovered by the developing roller 75. With further rotation of the photosensitive drum 77, the toner image is conveyed to a position opposing the paper P at the nip portion between the photosensitive drum 77 and the transfer roller 87.

The transfer roller 87 is a conductive roller that is covered with a silicon or urethane rubber surface dispersed with carbon black for conductivity. The transfer roller 87 is connected to a terminal, of a negative polarity, on a power source (not shown). Thus, the transfer roller 87 applies a negative polarity voltage to the paper P. The transfer roller 87 is urged toward the photosensitive drum 77, forcing the paper P to contact the photosensitive drum 77. As a result, the toner image is transferred from the photosensitive drum 77 onto the paper P.

After the toner image is transferred to the paper P, the paper P is further conveyed by the conveying unit 18 to the fixing unit 15. The fixing unit 15 includes a pressure roller 54 and a heat roller 52. The pressure roller 54 urges the paper P toward the heat roller 52, forcing the toner image on the paper P to contact the heat roller 52. The surface of the heat roller 52 is heated to a high temperature, causing the toner T to melt and permeate into the fibers of the paper P.

A first discharge roller 55 and first and second follower rollers 56 and 57 are provided downstream from the heat roller 52 in the paper conveying direction. The first discharge roller 55 is driven by a drive mechanism (not shown). The first and second follower rollers 56 and 57 move in association with the first discharge roller 55. The first discharge roller 55 and the first and second follower rollers 56 and 57 cooperate to discharge the paper P from the fixing unit 15 via the discharge unit 16 onto the paper supporting unit 69.

Next, the laser scanner 12 will be described in greater detail with reference to FIG. 2.

As shown in FIG. 2, the laser scanner 12 includes an exposure unit 47, a collimator lens (not shown), a cylindrical lens (not shown), a polygon mirror 23, and an f θ lens 31. The exposure unit 47 includes two laser diodes LD1 and LD2 (hereinafter also referred to collectively as laser diodes LD when not distinguishing between the two). In the exposure unit 47, the two laser diodes LD1 and LD2 are provided as being separated from each other by a predetermined distance. The laser diodes LD1 and LD2 emit laser beams LB1 and LB2 (hereinafter also referred to collectively as laser beams LB when not distinguishing between the two) that are modulated based on corresponding image signals. The laser beams LB1 and LB2 are projected onto the polygon mirror 23 via the collimator lens and the cylindrical lens (not shown). The polygon mirror 23 is driven by a drive motor 24 to rotate at a high speed in the direction indicated by the arrow in the drawing. The polygon mirror 23 deflects the laser beams LB1 and LB2 to move at a constant angular velocity. After passing through the fθ lens 31, the laser beams moves at a constant linear velocity. Accordingly, the laser beams LB1 and LB2 move approximately simultaneously in the main scanning direction M, shown by the arrow, at the same fixed speed, to expose two adjacent scanning lines SL1 and SL2 (hereinafter also referred to collectively as scanning lines SL when not distinguishing between the two) on the photosensitive drum 77.

A beam detector 49 is provided for detecting the laser beam LB1 just prior to when the laser beam LB1 starts scanning the photosensitive drum 77. Upon detecting the laser beam LB1, the beam detector 49 transmits a scan start signal to the control unit 9. The scan start signal indicates the timing at which each of successive series of main scanning operation starts.

The photosensitive drum 77 is driven by a stepping motor 78 (actuator) to rotate in the predetermined rotation direction R indicated by the arrow on the side of the drum in the drawing. The control unit 9 serves to drive the stepping motor 78 to rotate the photosensitive drum 77 at a timing that is synchronized with the timing of the main scan indicated by the scan start signal. The rotation of the photosensitive drum 77 moves the photosensitive material, provided on the surface of the photosensitive drum 77, to be exposed to the laser beams LB in the drum moving direction R. Thus, the laser beams LB gradually irradiate the entire photosensitive material in the auxiliary scanning direction A, that is defined as opposite to the drum rotating direction R, to form an entire latent image.

An optical rotary encoder 79 is provided to the photosensitive drum 77 to detect the rotations of the photosensitive drum 77. The optical rotary encoder 79 electrically converts the detected rotations of the photosensitive drum 77, and provides feedback to the control unit 9 for control. Although not shown in the drawing, the rotary encoder 79 includes a disk-shaped member and a light sensor. The disk-shaped member is formed with a plurality of slits at a prescribed angular interval. The light sensor is constructed from a light-emitting element and a light-receiving element. The disk-shaped member is provided so as to rotate together with the photosensitive drum 77. The light-emitting element and the light-receiving element are provided as being fixed to the wall of the processing unit 17 and so that the disk-shaped member is interposed between the light-emitting element and the light-receiving element. The light-receiving element detects light beams that have emitted from the light-emitting element and that have passed through the slits in the rotating disk-shaped member. The light-receiving element thus obtains data of velocity of the photosensitive drum 77, and converts the velocity data to electric signals in pulse form. The light-receiving element supplies the electric signals to the control unit 9.

Next, the control unit 9 will be described with reference to FIG. 3.

According to the present embodiment, the control unit 9 serves to control the entire laser printer 1 and also to regulate the intensity of the laser beam LB1 from the laser scanner 12. As shown in FIG. 3, the control unit 9 includes a hardware circuit portion 90 and a computer portion 100. The hardware circuit portion 90 includes: a velocity detecting circuit 91, a comparison circuit 92, a light intensity control circuit 93, a modulation circuit 94, an LD1 control circuit 95, and an LD2 control circuit 96. Those circuits 91–96 are constructed from electronic circuits. The computer portion 100 includes a CPU 101, a RAM 102, and a ROM 103.

It is noted that the functions of the electronic circuits 91–96 could be executed by a software process by the CPU 101 executing control programs stored in the ROM 103. In this case, the electronic hardware circuits 91–96 are not needed.

Figure 3:
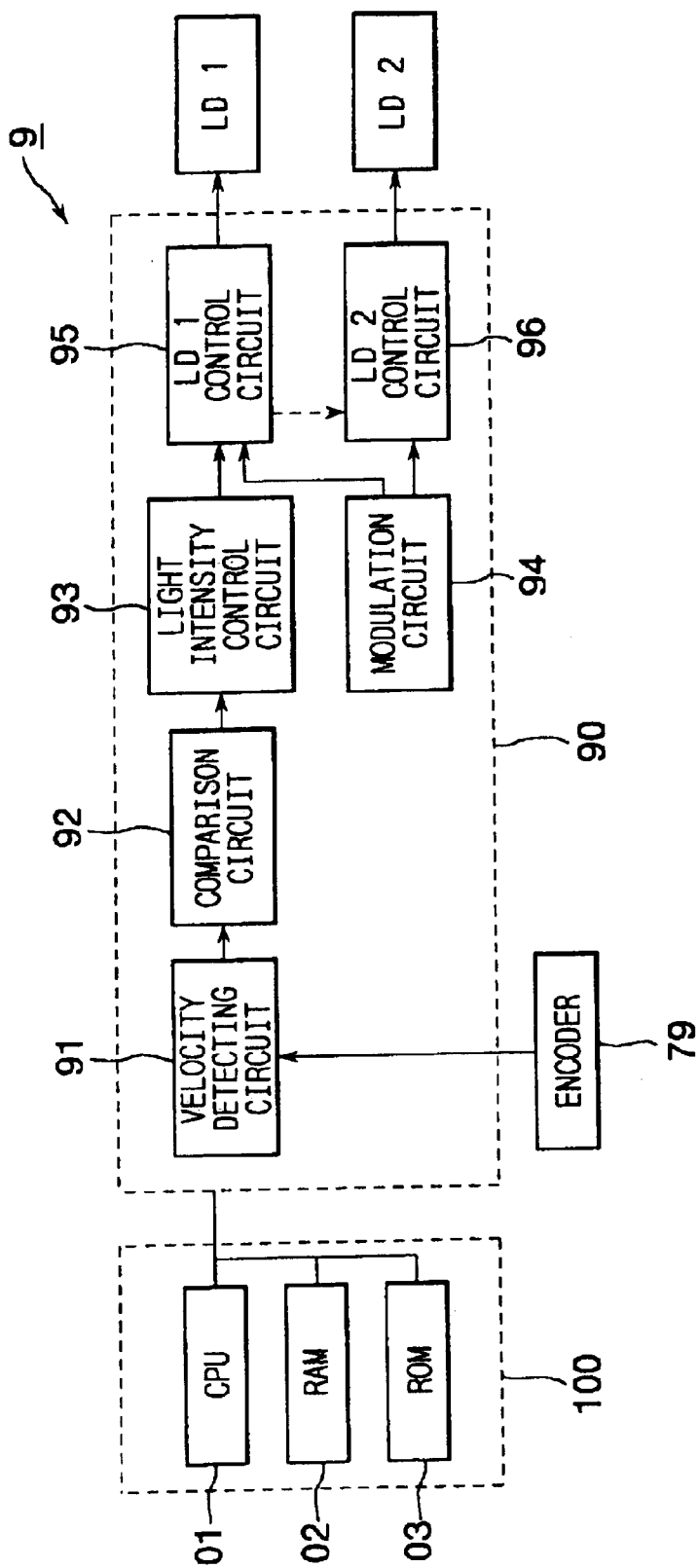
FIG. 3 is a block diagram showing a control unit for adjusting the amount of exposure in the laser scanner of FIG. 2.

As shown in FIG. 3, the velocity detecting circuit 91 is for receiving the velocity data, in electrical signals, supplied from the rotary encoder 79, and is for detecting the moving velocity (rotating speed) V of the photosensitive drum 77. The comparison circuit 92 is for comparing the detected moving velocity V to a predetermined reference moving velocity $V_0$ that is stored in the ROM 103. This reference moving velocity $V_0$ (m/s) is set to a proper moving velocity of the photosensitive drum 77 in relation to the main scanning period of the laser beams LB that is determined by the rotational speed and the total number of reflecting surfaces of the polygon mirror 23.

The light intensity control circuit 93 is for receiving the result of this comparison with the reference moving velocity $V_0$, and for outputting, to the LD1 control circuit 95, control signals for controlling the light intensity of the laser diode LD1. It is noted that the LD1 control circuit 95 is for outputting a laser diode drive signal (drive voltage) to the laser diode LD1, thereby letting the laser diode LD1 emit a laser beam with an intensity corresponding to the amount of the laser diode drive signal. Accordingly, the light intensity control circuit 93 controls the LD1 control circuit 95 to adjust the amount of its output, that is, the laser diode drive signal (drive voltage), based on the compared results.

For example, when the detected moving velocity V becomes slow, intervals between scanning lines SL become narrow and the amount of exposure becomes too great at the corresponding area on the photosensitive drum 77. Accordingly, the light intensity control circuit 93 controls the LD1 control circuit 95 to decrease its output (the voltage of the laser diode drive signal) at a proper ratio to decrease the exposure, thereby letting the laser diode LD1 attain a proper exposure. On the other hand, when the detected moving velocity becomes too fast, intervals between scanning lines become widened and the amount of exposure becomes too little at the corresponding area. Accordingly, the light intensity control circuit 93 controls the LD1 control circuit 95 to increase its output (the voltage of the laser diode drive signal) at another proper ratio to increase the exposure, thereby also letting the laser diode LD1 attain a proper exposure.

The LD2 control circuit 96 constantly outputs its laser diode drive signal at a fixed amount (drive voltage).

The modulation circuit 94 is for receiving desired image data input from outside, and for producing first image signals indicative of on and off conditions at respective scanning positions to be scanned by the laser beam LB1 and second image signals indicative of on and off conditions at respective scanning positions to be scanned by the laser beam LB2. The modulation circuit 94 outputs the first image signals to the LD1 control circuit 95, and outputs the second image signals to the LD2 control circuit 96. The first image signals serve as control signals for the LD1 control circuit 95, and the second image signals serve as control signals for the LD2 control circuit 96.

Accordingly, based on the inputted first image signals (control signals), the LD1 control circuit 95 modulates the laser diode drive signals, whose amounts are controlled by the light intensity control circuit 93, to turn on and off the laser diode LD1. Based on the inputted second image signals (control signals), the LD2 control circuit 96 modulates the laser diode drive signals, whose amounts are fixed, to turn on and off the laser diode LD2.

Figure 5:
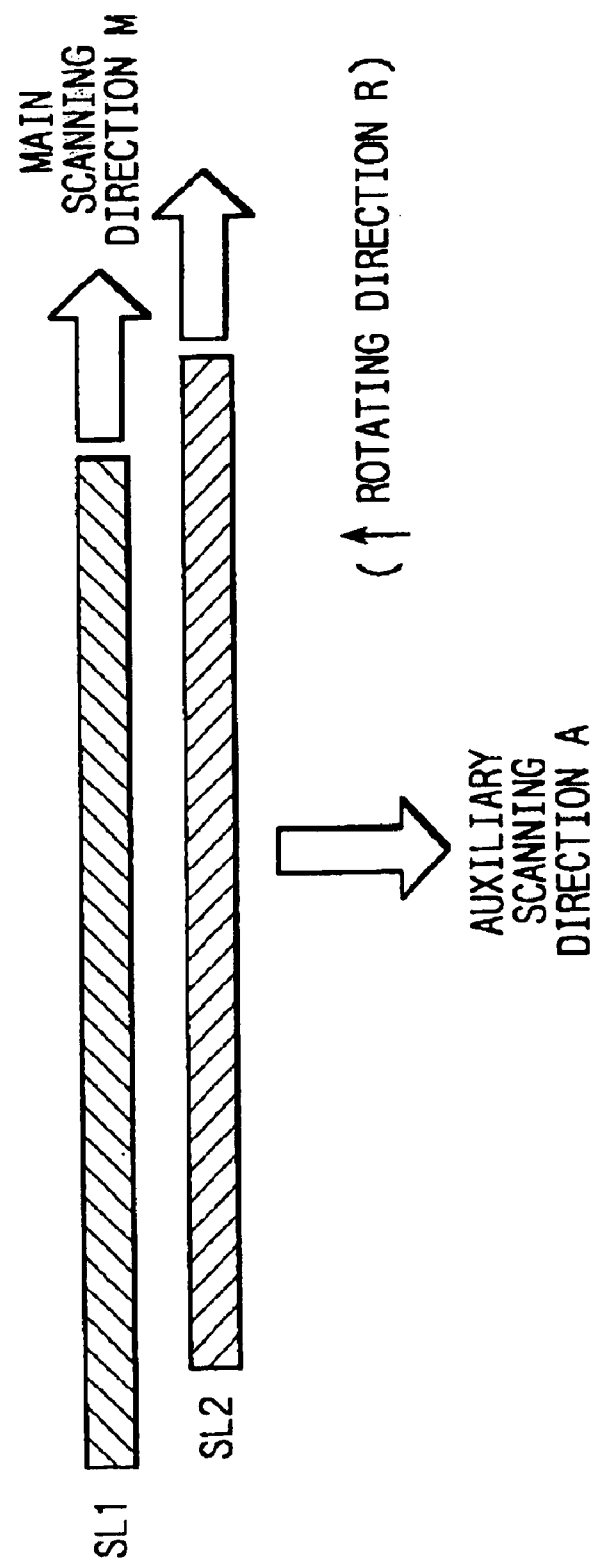
FIG. 5 is an explanatory diagram showing two scanning lines SL1 and SL2 on the photosensitive drum formed by two laser beams LB1 and LB2.

As shown in FIG. 5, the laser beam LB1, which has been modulated according to the first image signals and which has been emitted from the laser diode LD1, performs a main scan from left to right across the area indicated by the scanning line SL1. At the same time, the laser beam LB2, which has been modulated according to the second image signals and which has been emitted from the laser diode LD2, performs another main scan from left to right in the area indicated by the scanning line SL2. The two parallel scanning lines SL1 and SL2 are exposed on the photosensitive drum 77 simultaneously by the laser beams LB1 and LB2.

Figure 6:
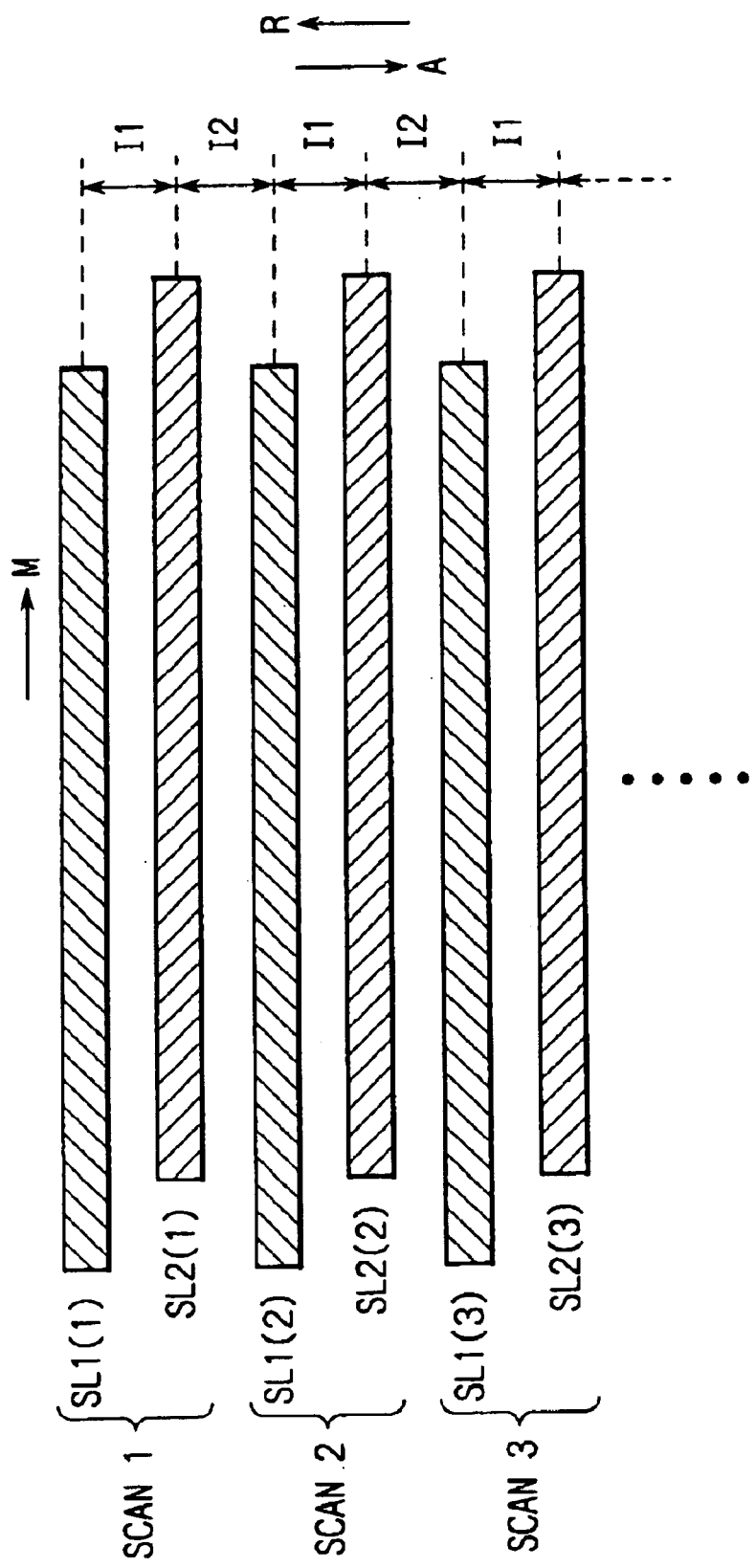
FIG. 6 is an explanatory diagram showing that successive series of main scanning lines are produced along the auxiliary scanning direction while the photosensitive drum rotates, each set of main scanning lines being formed simultaneously by the two laser beams.

The scanning lines SL1 and SL2 are separated from each other at a prescribed interval or distance I1 in the auxiliary scanning direction A as shown in FIG. 6. The amount of the interval I1 is fixed to a value that is determined by the factors including: the distance between the laser diodes LD1 and LD2: the length of the optical path along which the laser beams LB1 and LB2 travel from the laser diodes LD1 and LD2 to the photosensitive drum 77; and the focal lengths of the fθ lens 31, the collimator lens, and the cylindrical lens.

In the present embodiment, the start positions for exposing the scanning lines SL1 and SL2 are offset from each other. That is, the scanning lines SL2 begins at a position downstream, in the main scanning direction M, from the position where the scanning line SL1 begins. This positional relationship between the start positions for the scanning lines SL1 and SL2 is determined also according to the locations of the laser diodes LD1 and LD2.

It is noted that these start positions can be set the same with each other or can be set with the scanning line SL1 starting at a downstream side from the scanning line SL2 along the main scanning direction M.

As shown in FIG. 6, it is assumed that during a first scan, the laser beams LB1 and LB2 reflect off some reflecting surface of the rotating polygon mirror 23 (shown in FIG. 2) to simultaneously scan the scanning lines SL1(1) and SL2(1) according to the process described above. The interval between the scanning lines SL1(2) and SL2(2) are fixed to the prescribed interval I1. During the first scan, the photosensitive drum 77 rotates in the rotating direction R (opposite to the auxiliary scanning direction A).

After completing the first scan for the scanning lines SL1(1) and SL2(1), the laser beams LB1 and LB2 start reflecting off the next reflecting surface of the rotating polygon mirror 23. After the laser beam LB1 projects onto the beam detector 49, the two laser beams LB1 and LB2 begin the next scan. The photosensitive drum 77 continues rotating in the rotating direction R, also from when the laser beams LB1 and LB2 complete the first scan until the laser beam LB1 projects onto the beam detector 49 and the laser beams LB1 and LB2 begin the next scan.

During the next scan (second scan), the laser beam LB1 performs a main scan from the left end of the scanning line SL1(2). At the same time, the laser beam LB2 performs a main scan beginning from the left end of the scanning line SL2(2). The interval between the scanning lines SL1(2) and SL2(2) are fixed to the prescribed interval I1. The photosensitive drum 77 continues rotating still during the second scan.

Thus, the photosensitive drum 77 continues rotating in the rotating direction R. That is, the photosensitive drum 77 rotates in the rotating direction R while the laser beams LB perform scanning operation to form the scanning lines SL on the photosensitive drum 77. The photosensitive drum 77 rotates in the rotating direction R also after the laser beams LB complete a certain scan and before the laser beams LB begin the next scan.

Because the photosensitive drum 77 continues rotating from the beginning of the first scan until the completion of the second scan, the scanning line SL1(2) in the second scan will offset from the scanning line SL2(1) in the first scan at an interval I2. If the photosensitive drum 77 continues rotating at the prescribed reference velocity $V_0$ from the beginning of the first scan until the completion of the second scan, the interval I2 will be equal to the prescribed interval I1.

After completing the second scan, the laser beams LB1 and LB2 begin a third scan to expose scanning lines SL1(3) and SL2(3). The interval between the scanning lines SL1(3) and SL2(3) is also fixed to the prescribed interval I1. If the photosensitive drum 77 still continues moving at the prescribed reference velocity $V_0$, the interval I2 between the scanning line SL1(3) and the scanning line SL2(2) has a value equal to the interval I1.

In this way, the main scans are repeatedly performed, based on first and second image signals, to produce a successive sets of two scanning lines SL1 and SL2. While the main scans are thus repeatedly conducted, the photosensitive drum 77 continues rotating in the rotating direction R. Accordingly, the successive sets of two scanning lines SL1 and SL2 are arranged on the photosensitive drum 77 along the auxiliary scanning direction A, opposite to the rotating direction R, thereby forming a latent image on the photosensitive drum 77. In each set, the first scanning line SL1 is positioned in the upstream side or the rearmost side along the auxiliary scanning direction A, while the second scanning line SL2 is positioned in the downstream side or the forwardmost side along the auxiliary scanning direction A. The first scanning line SL1 in each set is positioned adjacent to and in the downstream side of the second scanning line SL2 in the preceding set. In other words, the second scanning line SL2 in each set is positioned adjacent to and in the upstream side of the first scanning line SL1 in the subsequent set.

The distance I1 between the first and second scanning lines SL1 and SL2 in each set is fixed to the prescribed value. Contrarily, the distance I2 between the first scanning line SL1 in each set and the second scanning line SL2 in the preceding set is determined dependently on the moving velocity of the photosensitive drum 77. When the photosensitive drum 77 is rotating at the reference velocity $V_0$, the distance I2 becomes equal to the distance I1, and therefore, the respective scanning lines in the successive scanning operations are arranged uniformly at the same interval I1.

The control unit 9 controls the stepping motor 78 to perform rotational movement along the rotating direction R at the reference velocity $V_0$ that is synchronized with the main scanning period by the laser beam LB1. However, the velocity of the photosensitive drum 77 will possibly decrease when printing paper is fed along the printing conveying path or when the voltage of the power source for the stepping motor 78 drops. The velocity of the photosensitive drum 77 will possibly decrease for other causes.

FIG. 7 shows the case when the velocity of the photosensitive drum 77 is smaller than the reference velocity $V_0$. During the first scan, the first and second scanning lines SL1(1) and SL2(1) are scanned simultaneously by the laser beams LB1 and LB2. The scanning lines LS1(1) and SL2(1) are separated from each other by the prescribed interval I1. After completing the first scan, the second scan beings after the laser beam LB1 projects the beam detector 49. However, the auxiliary scan attained by the rotation of the photosensitive drum 77 does not cover the prescribed distance I1 before the second scan begins, resulting in that an interval I2, between the scanning line SL2(1) in the first scan and the scanning line SL1(2) in the second scan, becomes narrower than the interval I1. The narrow interval I2, as in this case, gives this portion of the image a higher image density than other exposed portions. Therefore, this area cannot be exposed accurately according to the original image data.

The velocity of the photosensitive drum 77 can increase by temporary voltage increases in the power source, for example. FIG. 8 shows the case when the velocity of the photosensitive drum 77 is greater than the reference velocity $V_0$. During the first scan, the first and second scanning lines SL1(1) and SL2(1) are scanned simultaneously by the laser beams LB1 and LB2. The scanning lines LS1(1) and SL2(1) are separated from each other by the prescribed interval I1. After completing the first scan, the second scan beings after the laser beam LB1 projects the beam detector 49. However, in this case, the movement in the auxiliary scanning direction A exceeds the prescribed distance I1 by the time the second scan begins, resulting in an interval I2 between the scanning line SL2(1) in the first scan and the scanning line SL1(2) in the second scan being larger than the interval I1. The wide interval I2, as in this case, gives this portion of the image a lower image density than other exposed portions. Therefore, this area cannot be exposed accurately according to the original image data.

Deviations in intervals I between adjacent scanning lines SL, particularly in solid areas of an intermediate tone, can result in the appearance of very noticeable striped patterns. The laser scanner 12 of the present embodiment can lessen this density irregularity by regulating the laser beam intensity from the laser diode LD1 using the method of control described below.

Here, the control process in the laser scanner 12 will be described with reference to FIGS. 2, 3, and 4 for the cases of the velocity of the photosensitive drum 77 changing as described above.

Figure 4:
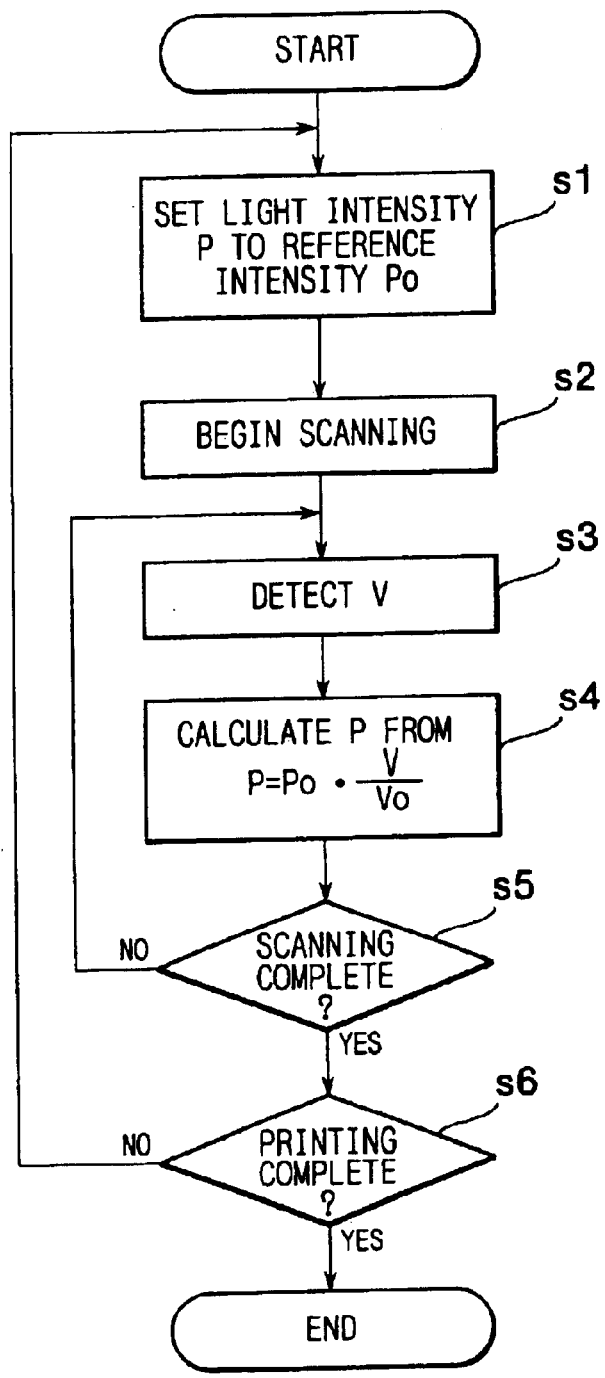
FIG. 4 is a flowchart showing a procedure for regulating the exposure amount of a laser diode based on the auxiliary scanning velocity.

Data of the control program represented by the flowchart of FIG. 4 is stored in the ROM 103, and is executed by the CPU 101. The CPU 101 starts executing the control processes of FIG. 4 when receiving from outside a print instruction and image data.

First, in step 1 (hereinafter Step will abbreviated to "S"), the CPU 101 controls the light intensity control circuit 93 to initialize the light intensity P of the laser diode LD1 to a predetermined reference beam intensity $P_0$. The beam intensity P represents the amount in which the laser diode LD1 should actually radiate. Receiving the thus set amount of the reference beam intensity $P_0$, the LD1 control circuit 95 regulates drive voltages (laser diode drive signals), thereby driving the laser diode LD1 to emit the laser beam LB1 of the beam intensity $P_0$.

Then, in S2, the CPU 101 begins the first scanning operation. That is, the CPU 101 controls the LD1 control circuit 95 and the LD2 control circuit 96 to output unmodulated drive voltages to the laser diodes LD1 and LD2, thereby letting the laser diodes LD1 and LD2 to emit unmodulated laser beams LB1 and LB2. The laser diodes LD1 and LD2 emit the laser beams LB1 and LB2 onto the rotating polygon mirror 23, which in turn deflects the laser beams.

When the laser beam LB1 projects onto the beam detector 49, the beam detector 49 transmits a signal to the control unit 9. Receiving the signal from the beam detector 49, the CPU 101 determines the main scanning start timing. The first main scan is then performed across the photosensitive drum 77 by the laser beam LB1 and LB2. More specifically, when a predetermined time passes after the reception of the signal from the beam detector 49, the CPU 101 starts controlling the modulation circuit 94 to produce first and second image signals, based on the inputted image data, and to output the first and second image signals to the LD1 control circuit 95 and the LD2 control circuit 96, respectively. Upon receiving the image signals, the LD1 control circuit 95 and LD2 control circuit 96 modulate drive voltages, and output the modulated drive voltages to the laser diodes LD1 and LD2. The laser diodes LD1 and LD2 emit modulated laser beams LB1 and LB2 onto the rotating polygon mirror 23, which in turn deflects the laser beams to form the scanning lines SL1 and SL2 on the photosensitive drum 77 from their scanning start positions.

While the first main scanning operation is thus executed in the timing synchronized to the timing detected by the beam detector 49, the photosensitive drum 77 is rotated by the stepping motor 78 in the rotating direction R. Rotations of the photosensitive drum 77 are detected by the rotary encoder 79, which transmits intermittent signals to the velocity detecting circuit 91.

Accordingly, in S3, the CPU 101 controls the velocity detecting circuit 91 to count the time intervals between the successive edges of the received intermittent signals, to thereby detect the angular speed, at which the photosensitive drum 77 is presently rotating. From this value, the velocity detecting circuit 91 calculates the moving velocity, that is, the velocity V (m/s) in the rotating direction R, of the photosensitive material on the photosensitive drum 77.

In S4, the CPU 101 controls the comparison circuit 92 to compare the moving velocity V, detected by the velocity detecting circuit 91, to the reference conveying velocity $V_0$, stored in the ROM 103, by calculating the ratio $V/V_0$ that represents the change in the conveying or moving velocity.

It is noted that in the above description, the velocity detecting circuit 91 calculates the actual value of the present moving velocity V. However, the velocity detecting circuit 91 may simply detect the time intervals between the intermittent signals from the encoder 79, and transmit the detected interval data to the comparison circuit 93. In this case, the ROM 103 also stores data of a time interval indicative of the reference velocity data $V_0$. The comparison circuit 93 therefore calculates the ratio $V/V_0$ based on the received interval data and the interval data indicative of the reference velocity data $V_0$. In this case, the velocity detecting circuit 91 does not need to calculate the actual velocity value V.

Then, the CPU 101 controls the light intensity control circuit 93 to calculate the proper light intensity P from the following equation:

$$P=P_0(V/V_0)$$

Thus, according to the present embodiment, the comparison circuit 92 calculates the ratio $V/V_0$ that is indicative of the change in velocity in the auxiliary scanning direction A. Receiving the calculated ratio $V/V_0$, the light intensity control circuit 93 determines that the light intensity P of the laser diode LD 1 should be changed from the reference light intensity $P_0$ by the same ratio $V/V_0$.

In the above description, the light intensity control circuit 93 calculates the actual value P of intensity of light that the laser diode D1 should emit. However, the light intensity control circuit 93 may merely calculate the ratio $P/P_0$ by calculating the following formula:

$$P/P_0 = V/V_0$$

It is sufficient that the light intensity control circuit 93 calculate the ratio $P/P_0$, which is indicative of the amount by which the light intensity from the laser diode LD1 should change from the reference intensity $P_0$.

The light intensity control circuit 93 outputs the thus calculated value P or $P/P_0$ to the LD1 control circuit 95. Upon receiving the value P or $P/P_0$, the LD1 control circuit 95 regulates the drive signal outputs for the laser diode LD1 so that the laser diode LD1 will generate output for emitting a laser beam with the calculated amount P.

While the present single main scan has not yet completed (No in S5), processes in S3 and S4 are repeated at a prescribed sampling period. Thus, while each main scan is performed, the velocity of the photosensitive drum 77 is repeatedly detected and the light intensity of the laser diode LD1 is repeatedly adjusted in accordance with the detected velocity of the photosensitive drum 77. Thus, the distance I2 between the first scanning line SL1 in each scan and the second scanning line SL2 in the preceding scan is repeatedly adjusted according to the moving velocity of the photosensitive drum 77 in each scan.

When one main scanning process is completed (Yes in S5), the CPU 101 determines in S6 whether the printing process is completed. If there is still remaining image data to be printed (No is S6), then the light intensity P is again initialized to the reference light intensity $P_0$ is S1 and the next scan begins in S2. Then, the processes in S2–S6 are repeated. The CPU 101 determines the start of the second scan when the laser beam LB1 again projects onto the beam detector 49. In this way, the beam detector 49 detects the beginning point of each main scan.

While the printing process has not yet completed (No in S6), the processes in S1–S6 are repeated. Accordingly, in each scan, the distance I2, between the first scanning line SL1 in each scan and the second scanning lines SL2 in the preceding scan, is repeatedly known based on the moving velocity of the photosensitive drum 77 detected during each scan, and the intensity of the laser diode LD1 is repeatedly adjusted according to the known distance I2.

When the printing process is completed (Yes in S6), the process ends.

As described above, according to the laser printer 1 of the present embodiment, the two laser beams LB1 and LB2 are modulated according to the image signals, and are deflected by the polygon mirror 23 to simultaneously scan two adjacent scanning lines SL1 and SL2 across the photosensitive drum 77 in the main scanning direction M. At the same time, the photosensitive drum 77 is rotated to move the photosensitive material in the rotating direction R in order to allow the two scanning lines SL1 and SL2 to gradually move across the photosensitive material in the auxiliary scanning direction A that is opposite to the rotating direction R. Accordingly, a latent image is formed on the photosensitive medium at a high rate of speed.

Simultaneously, the velocity detecting circuit 91 and the comparison circuit 92 cooperate to detect the moving velocity V of the photosensitive material and to compare the detected moving velocity V with the reference moving velocity $V_0$. The light intensity control circuit 93 regulates the light intensity of only the laser beam LB1 based on the results of this comparison. Thus, the amount of exposure can be carefully adjusted based on the positional distance between the scanning line SL1 on the present main scan and the scanning line SL2 on the preceding main scan. It is therefore possible to produce very precise images with a good exposure balance at a high rate of speed.

More specifically, when the velocity detecting circuit 91 and the comparison circuit 92 detect that the photosensitive medium 77 is moving at a velocity different from the reference velocity, the light intensity control circuit 93 adjusts the light intensity of the laser beam LB1, which forms the scanning line SL1 that is one of the two scanning lines SL1 and SL2 and that is positioned in the upstream or rearmost side in the auxiliary scanning direction A. By adjusting the light intensity of the laser beam LB1, it is possible to adjust the exposure amount of the areas scanned by the scanning line SL1 in the present scan and scanned by the scanning line SL2 in the preceding scan. By adjusting the least possible number of scanning lines SL (one, in this case), it is possible to expose a detailed image with good balance and no overall irregularities.

For example, when the velocity detecting circuit 91 and the comparison circuit 92 detect the photosensitive medium 77 moving at a velocity slower than the reference velocity, the light intensity control circuit 93 reduces the light intensity of the laser beam LB1 based on the detected velocity. When the velocity detecting circuit 91 and the comparison circuit 92 detect the photosensitive medium 77 moving at a velocity faster than the reference velocity, the light intensity control circuit 93 increases the light intensity of the laser beam LB1. Accordingly, it is possible to regulate the exposure amount from the laser beams LB1 and LB2. Therefore, it is possible to attain a fully-balanced exposure, even when variations in velocity occur in the auxiliary scanning direction A, by decreasing or increasing the light intensity by the laser beam LB1 according to the velocity variations.

The laser scanner 12 can be modified as described below.
(First Modification)

For example, the total number of the laser diodes LD mounted in the laser scanner 12 is not limited to two. Three or more laser diodes LD can be provided in the laser scanner 12.

For example, although not shown in the drawing, three laser diodes LD101, LD102, and LD103 can be provided in the laser scanner 12 in place of the two laser diodes LD1 and LD2. In this case, the three laser diodes LD101, LD102, and LD103 simultaneously emit laser beams LB101, LB102, and LB103 to form three parallel scanning lines SL101, SL102, and SL103 on the photosensitive drum 77 as shown in FIG. 9.

The laser beam LB101 is modulated according to corresponding image signals and is emitted from the laser diode LD101 to perform a main scan from left to right across the area indicated by the scanning line SL101. At the same time, the laser beam LB102 is modulated according to corresponding image signals and is emitted from the laser diode LD102 to perform the same main scan from left to right in the area indicated by the scanning line SL102. Furthermore, the laser beam LB103 is modulated according to corresponding image signals and is emitted from the laser diode LD103 to perform the same main scan from left to right in the area indicated by the scanning line SL103.

As shown in FIG. 10, the scanning line SL102 is offset a prescribed interval I101 from the scanning line SL101 in the auxiliary scanning direction A. The scanning line SL103 is offset also the same prescribed interval I101 from the scanning line SL102 in the auxiliary scanning direction A.

It is noted that the interval between the scanning lines SL101 and SL102 has a fixed value that is determined dependently on the distance between the laser diodes LD101 and LD102, the focal lengths of the fθ lens 31, the collimator lens, and the cylindrical lens, and the length of the optical path along which the laser beams LB101 and LB102 travel from the laser diodes LD101 and LD102 to the photosensitive medium 77. Similarly, the interval between the scanning lines SL102 and SL103 has a fixed value that is determined dependently on the distance between the laser diodes LD102 and LD103, the focal lengths of the fθ lens 31, the collimator lens, and the cylindrical lens, and the length of the optical path along which the laser beams LB102 and LB103 travel from the laser diodes LD102 and LD103 to the photosensitive medium 77. According to this modification, therefore, the locations of the three laser diodes LD101–LD103 are selected so that the three scanning lines SL101–SL103 be arranged at the same interval I101 in the auxiliary scanning direction A.

Thus, according to this modification, parallel scanning lines SL101, SL102, and SL103 are exposed simultaneously by the laser beams LB101, LB102, and LB103. The start positions for the scanning lines SL101, SL102, and SL103 are offset from one another in the main scanning direction M similarly to the above-described embodiment. However, these start positions can be set on the same positions in the main scanning direction M. Or, these start positions can be set in other manners.

Also according to this modifications, as shown in FIG. 10, successive series of scanning are performed. In each scanning operation, three rows of main scanning lines SL101, SL102, and SL103 are produced by the three laser beams LB101. LB102, and LB103 simultaneously, while the photosensitive medium 77 is rotating.

For example, during the first scan, the laser beams LB101, LB102, and LB103 are reflected off some reflecting surface of the rotating polygon mirror 23 to scan three scanning lines SL101(1), SL102(1), and SL103(1). After completing the first scan, the laser beams LB101, LB102, and LB103 are reflected off the next reflecting surface of the rotating polygon mirror 23 to scan the next set of lines. It is noted that the photosensitive drum 77 continuously rotates in the rotating direction R. That is, the photosensitive drum 77 rotates while the laser beams LB form the scanning lines SL, and rotates also after the laser beams LB complete some scan and before the laser beams LB begin the next scan.

Then, the laser beam LB101 begins performing a main scan from the left end of the scanning line SL101(2). The laser beam LB102 begins performing a main scan beginning from the left end of the scanning line SL102(2). Further, the laser beam LB103 begins performing a main scan beginning from the left end of the scanning line SL103(2). The intervals between each two adjacent scanning lines SL101 (2), SL102(2), SL103(2) are fixed to the value I101.

Thus, after the first scan is completed and before the laser beams LB101, LB102, and LB103 begin a second main scan, the photosensitive drum 77 still continues rotating. Accordingly, the photosensitive drum 77 continues rotating from the beginning of the first scan until the completion of the second scan. As a result, an interval I102 is formed between the scanning line SL101(2) (most upstream side line in the auxiliary scanning direction A) in the second scan and the scanning line SL103(1) (most downstream side line in the auxiliary scanning direction A) in the preceding scan.

Here, when the photosensitive drum 77 rotates at the reference velocity $V_0$, the interval I102 becomes equal to the prescribed interval I101.

When the second scan is completed, the laser beam LB101 again begins performing a main scan beginning from the left end of the scanning line SL101(3), the laser beam LB102 begins a main scan from the left end of the scanning line SL102(3); and the laser beam LB103 begins a main scan from the left end of the scanning line SL103(3).

In this way, the main scans are repeated based on image signals while performing scans in the auxiliary scanning direction A to create equivalent intervals I101 and I102 over the photosensitive drum 77 when the photosensitive drum 77 rotates at the reference velocity $V_0$.

When the moving velocity of the photosensitive medium 77 in relation to the main scanning velocity is, slower than the reference velocity $V_0$, as shown in FIG. 11, after the laser beams LB101, LB102, and LB103 scan the scanning lines SL101(1), SL102(1), and SL103(1) at the prescribed interval I101 in the first scan, the auxiliary scan by the rotation of the photosensitive drum 77 does not reach the prescribed distance I101 before the second scan begins. Hence, the interval I102 between the scanning line SL103(1) (most downstream line in the first scan) and the scanning line SL101(2) (most upstream line in the second scan) becomes narrower than the prescribed interval I101. When the interval I102 is narrow, the image at this part will be denser than in other exposed areas. Therefore, this area is not exposed accurately based on the original image data.

When the moving velocity of the photosensitive medium 77 in relation to the main scanning velocity is faster than the reference velocity $V_0$, as shown in FIG. 12, after the laser beams LB101, LB102, and LB103 scan the scanning lines SL101(1), SL102(1), and SL103(1) at the prescribed interval I101 in the first scan, the auxiliary scan attained by the rotation of the photosensitive drum 77 exceeds the prescribed distance I101 by the time the second scan begins. Hence, the interval I102 between the scanning line SL103(1) (most downstream side line in the first scan) and the scanning line SL101(2) (most upstream side line in the second scan) becomes wider than the prescribed interval I101. When the interval I102 is wide, the image at this part becomes less dense than in other exposed areas. Therefore, this area is not exposed accurately based on the original image data.

In order to overcome the above-described problems, according to the present modification, the laser diode LD101 is controlled according to the same method as that for controlling the laser diode LD1 in the above-described embodiment. In other words, the output to the laser diode LD101 is raised or dropped according to the ratio $V/V_0$, thereby increasing or decreasing the light intensity from the laser diode LD101. Hence, the exposure amount for the region covered by the narrow or wide interval I102 between the scanning lines SL103(1) and SL101(2) is adjusted to prevent the image density from begin greater than or less than that in other exposed areas.

Thus, according to this modification, it is possible to adjust the density at regions covered by the interval I102 that changes in size due to the auxiliary scanning velocity V. When the velocity detecting circuit 91 detects a movement velocity of the photosensitive medium 77 different from the prescribed reference velocity $V_0$, the comparison circuit 92 and the light intensity control circuit 93 changes, based on the detected velocity, the light intensity of the laser beam LB101, which is one of the three laser beams LB101–LB103 and which scans the most upstream side line (the rearmost scanning line) SL101 in the auxiliary scanning direction A and therefore is affected by the velocity variations. In this way, it is possible to regulate the exposure balance of the scanning lines SL. It is possible to expose a detailed image having good balance with no overall irregularities by regulating the light intensity for a minimum number of scanning lines SL.

The total number of laser diodes LD that scan simultaneously is not limited to three. A larger number of laser diodes LD can be provided to the laser scanner 12 for scanning simultaneously. In this case, it is possible to adjust the density of the image by regulating the light intensity from one laser diode LD that emits a laser beam forming the rearmost or most upstream side scanning line SL in the auxiliary scanning direction A.

(Second Modification)

A second variation will be described below.

According to the above-described embodiment and modification, the exposure balance is regulated by adjusting the light intensity from one of the plurality of laser diodes LD that emits a laser beam LB for scanning the rearmost or the most upstream side scanning line SL in the auxiliary scanning direction A. However, it is possible to regulate the exposure balance by adjusting the light intensity for another laser diode that scans the forwardmost or the most downstream side scanning line SL in the auxiliary scanning direction A.

For example, it is possible to adjust the light intensity of the laser diode LD2 that forms the scanning line SL2 in FIG. 5 or the light intensity of the laser diode LD103 that forms the scanning line SL103 in FIG. 9.

Also in this modification, the velocity detecting circuit 91 and the comparison circuit 92 detect the moving velocity of the photosensitive medium 77 at the present scan. Based on the detected moving speed at the present scan, it is possible to predict the interval between the forwardmost scanning line in the present scan and the rearmost scanning line in the next scan. Then, the light intensity at the forwardmost scanning line in the present scan is regulated based on the predicted interval.

For example, when the two laser diodes LD1 and LD2 are provided as in the above-described embodiment, the velocity detecting circuit 91 and the comparison circuit 92 detect the moving velocity of the photosensitive medium 77 at the first scan. Based on the detected moving speed at the first scan, it is possible to predict the interval I2 between the forwardmost scanning line SL2(1) in the present scan and the rearmost scanning line SL1(2) in the next scan. Then, the light intensity at the forward most scanning line SL2(1) in the present scan is regulated based on the predicted interval.

When the detected velocity V is greater than the reference velocity $V_0$, it can be predicted that the interval I2 between the forwardmost scanning line SL2 in the present scan and the rearmost scanning line SL1 in the next scan will become greater than the size of the interval I1. Therefore, adjustment is performed to increase the light intensity for the forwardmost scanning line SL2 in the present scan.

When the detected velocity V is smaller than the reference velocity $V_0$, it can be predicted that the interval I2 between the forwardmost scanning line SL2 in the present scan and the rearmost scanning line SL1 in the next scan will become smaller than the size of the interval I1. Therefore, adjustment is performed to decrease the light intensity for the forwardmost scanning line SL2 in the present scan.

The above-described operation can be achieved by modifying the structure and the operation of the above-described embodiment in a manner described below.

As indicated by dotted line in FIG. 3, the control unit 9 is modified so that the light intensity control circuit 93 controls the LD2 control circuit 96 instead of the LD1 control circuit 95. The thus modified control unit 9 performs the operation of FIG. 4 by controlling the LD2 control circuit 96 to drive the laser diode LD2 to emit laser beam LB2 with the light intensity P calculated in S4.

It is noted that the regulation according to this method is effective when the moving velocity V keeps in some condition that is slower or faster than the reference moving velocity $V_0$ during several scanning operations. However, if the moving velocity V becomes slow or fast on only one scan, it is preferable to employ the method of the above-described embodiment to adjust the laser diode LD1 for scanning the rearmost or upstream side scanning line SL1 in the auxiliary scanning direction A.

The present modification can be applied to the case of the first modification where the three laser diodes LD101–LD103 are provided. The velocity detecting circuit 91 and the comparison circuit 92 detect the moving velocity of the photosensitive medium 77 at the first scan. Based on the detected moving speed at the first scan, it is possible to predict the interval I102 between the forwardmost scanning line SL103(1) in the present scan and the rearmost scanning line SL101(2) in the next scan. Then, the light intensity at the forwardmost scanning line SL103(1) in the present scan is regulated based on the predicted interval.

(Third Modification)

In the above-described embodiment and the first modification, the intensity of only the laser beam LB that forms the most upstream side or the rearmost scanning line SL is adjusted. In the second modification, the intensity of only the laser beam LB that forms the most downstream side or the forwardmost scanning line SL is adjusted.

According to the present modification, the above-described embodiment and the first modification and the second modification are combined together. More specifically, when the detected velocity V becomes different from the reference velocity $V_0$, it can be predicted that the interval I2 or I102 between the forwardmost scanning line SL2 or SL103 in the present scan and the rearmost scanning line SL1 or SL101 in the next scan will become different from the size of the interval I1 or I101. It is therefore desirable to change the light intensities for both of the forwardmost scanning line SL2 or SL103 in the present scan and the rearmost scanning line SL1 or SL101 in the next scan.

For example, when the detected velocity V is greater than the reference velocity $V_0$, it can be predicted that the interval I2 or I102 between the forwardmost scanning line SL2 or SL103 in the present scan and the rearmost scanning line SL1 or SL101 in the next scan will become greater than the size of the interval I1 or I101. It is therefore desirable to increase the light intensities for both of the forwardmost scanning line SL2 or SL103 in the present scan and the rearmost scanning line SL1 or SL101 in the next scan.

When the detected velocity V is smaller than the reference velocity $V_0$, it can be predicted that the interval I2 or I102 between the forwardmost scanning line SL2 or SL103 in the present scan and the rearmost scanning line SL1 or SL101 in the next scan will become smaller than the size of the interval I1 or I101. It is therefore desirable to decrease the light intensities for both of the forwardmost scanning line SL2 or SL103 in the present scan and the rearmost scanning line SL1 or SL101 in the next scan.

In order to adjust the light intensity for the rearmost scanning line SL1 or SL101 in the next scan, data of the velocity detected during the present scan may be stored in the RAM 102 so as to be used during the next scan to adjust the light intensity of the laser diode LD1.

According to this modification, adjustment is shared by the greater number of laser diodes LD than the single laser diode LD. It therefore becomes possible to correct irregularities in exposure, caused by variations of the moving velocity, in a more natural way.

While the invention has been described in detail with reference to the specific embodiment and modifications thereof, it would be apparent to those skilled in the art that various changes and modifications may be made therein without departing from the spirit of the invention.

In the above-described embodiment and modifications, when the moving velocity increases, the light intensity is controlled to increase. When the moving velocity decreases, the light intensity is controlled to decrease. However, the control may be attained only when the moving velocity decreases. In general, the velocity of the photosensitive medium 77 is decreased by printing paper being fed into the conveying path or by a drop in voltage. Contrarily, there are relatively few times when the moving velocity increases. In this modification, the control unit 9 may be configured to perform control only to decrease the light intensity. It therefore becomes unnecessary to provide the laser scanner 12 with a mechanism to increase the light intensity of the laser diode(s) LD from their usual outputs. Accordingly, the entire construction of the multibeam scanner 12 can be simplified.

Furthermore, in the above-described embodiment and modifications, regulation of the exposure amount is executed by increasing or decreasing the light intensity proportionally to the change in the moving velocity. However, the regulation of the exposure amount is not limited to this adjusting scheme. For example, it is possible to attain a printing result more natural to the eye by regulating the light intensity P proportional to the square of the change in velocity, as in $P=P_0 (V^2 V_0^2)$.

In the above-described embodiment and modifications, the laser diodes LD are employed as light sources emitting light beams LB. However, the light source is not limited to a laser diode, but can be any light source that is capable of scanning and emitting a light beam.

Further, the device for deflecting the light beam is not limited to the polygon mirror, but can be a galvanometer, hologram disk or the like.

The optical system for focusing the modulated light onto the photosensitive medium is not limited to the construction described above that includes the collimator lens, the cylindrical lens, and the fθ lens 31.

The photosensitive body 77 is not limited to the cylindrical drum type, but can also be flat type.

Further, the multibeam scanner of the present embodiment and modifications can be applied to many apparatuses other than the laser printer.

What is claimed is:

1. A multibeam scanning device, comprising:
   a photosensitive medium moving unit moving a photosensitive medium in a predetermined moving direction, an auxiliary scanning direction being defined as a direction opposite to the predetermined moving direction;
   a light beam unit that emits a plurality of light beams;
   a beam deflecting unit deflecting the plurality of light beams, which are modulated according to image signals, to simultaneously scan the plurality of light beams on a corresponding plurality of scanning lines that extend along a predetermined main scanning direction on the photosensitive medium, while the photosensitive medium moves in the predetermined moving direction, thereby exposing a corresponding image on the photosensitive medium, the main scanning direction being substantially orthogonal to the moving direction, the plurality of scanning lines being arranged adjacent to one another in the auxiliary scanning direction;
   a movement velocity detector detecting the movement velocity of the photosensitive medium along the predetermined moving direction; and
   a light intensity control unit controlling the light beam unit to adjust the intensity of a part of the plurality of light beams based on the detected moving velocity of the photosensitive medium.

2. A multibeam scanning device as claimed in claim 1, wherein the light intensity control unit controls the light beam unit to adjust, based on the detected moving velocity of the photosensitive medium, the intensity of at least one of two light beams in the plurality of light beams, the two light beams including a first light beam and a second light beam, the first light beam being scanned in a first scanning line that is located in a most upstream side of the plurality of scanning lines along the auxiliary scanning direction, the second light beam being scanned in a second scanning line that is located in a most downstream side of the plurality of scanning lines along the auxiliary scanning direction.

3. A multibeam scanning device as claimed in claim 2, wherein the light intensity control unit controls the light beam unit to adjust the intensity of the first light beam based on the detected moving velocity of the photosensitive medium.

4. A multibeam scanning device as claimed in claim 2, wherein the light intensity control unit controls the light beam unit to adjust the intensity of the second light beam based on the detected moving velocity of the photosensitive medium.

5. A multibeam scanning device as claimed in claim 2, wherein the light intensity control unit controls the light beam unit to adjust the intensities of both of the first and second light beams based on the detected moving velocity of the photosensitive medium.

6. A multibeam scanning device as claimed in claim 2,
   wherein the beam deflecting unit deflects the plurality of light beams in the main scanning direction repeatedly to form a successive sets of plural scanning lines while the photosensitive medium moving unit moves the photosensitive medium in the predetermined moving direction, thereby forming the successive sets of scanning lines to be arranged in the auxiliary scanning direction, and
   wherein the light intensity control unit controls the light beam unit to adjust, based on the detected moving velocity of the photosensitive medium, the intensity of at least one of the first and second light beams, the first light beam forming, in each set, a first scanning line that is located adjacent to a scanning line in a preceding set of scanning lines, the second light beam forming, in each set, a second scanning line that is located adjacent to a scanning line in a subsequent set of scanning lines.

7. A multibeam scanning device as claimed in claim 6, wherein the movement velocity detector repeatedly detects the velocity of the photosensitive medium while the beam deflecting unit forms each set of plural scanning lines, the light intensity control unit repeatedly performing the control operation based on the detected results.

8. A multibeam scanning device as claimed in claim 7, wherein the light intensity control unit controls the light beam unit to adjust the intensity of the first light beam that forms the first scanning line in a present set, based on the amount of the velocity that is being presently detected while the present set of plural scanning lines are being formed, the presently-detected amount of velocity indicating the amount of a distance between the first scanning line in the present set and the second scanning line in the preceding set along the auxiliary scanning direction.

9. A multibeam scanning device as claimed in claim 7, wherein the light intensity control unit controls the light beam unit to adjust the intensity of the second light beam that forms the second scanning line in the present set, by predicting the amount of a distance between the second scanning line in the present set and the first scanning line in the next set along the auxiliary scanning direction, based on the amount of the velocity that is being presently detected while the present set of plural scanning lines are being formed.

10. A multibeam scanning device as claimed in claim 7, wherein the light intensity control unit controls, based on the amount of the velocity that is being presently detected while the present set of plural scanning lines are being formed, the light beam unit to adjust the intensity of the second light beam that forms the second scanning line in the present set and the intensity of the first light beam that forms the first scanning line in the next set, the presently-detected amount of velocity predicting the amount of a distance between the second scanning line in the present set and the first scanning line in the next set along the auxiliary scanning direction.

11. A multibeam scanning device as claimed in claim 2, wherein the light intensity control unit includes:

a velocity comparing unit comparing the detected velocity with a predetermined reference velocity; and an intensity changing unit that changes the intensity of at least one of the first and second light beams based on the compared result.

12. A multibeam scanning device as claimed in claim 11, wherein the light beam unit initially emits each of the plurality of light beams at a predetermined intensity, and wherein the intensity changing unit changes the intensity of the at least one light beam from the predetermined intensity when the compared result shows that the moving velocity of the photosensitive medium is different from the predetermined reference velocity.

13. A multibeam scanning device as claimed in claim 12, wherein the intensity changing unit increases the intensity of the at least one light beam from the predetermined intensity when the compared result shows that the moving velocity of the photosensitive medium is greater than the predetermined reference velocity.

14. A multibeam scanning device as claimed in claim 12, wherein the intensity changing unit decreases the intensity of the at least one light beam from the predetermined intensity when the compared result shows that the moving velocity of the photosensitive medium is smaller than the predetermined reference velocity.

15. A multibeam scanning device as claimed in claim 11, wherein the intensity changing unit includes:

an intensity calculating unit that calculates a desired amount of intensity by multiplying the predetermined intensity with a ratio of the detected velocity relative to the predetermined reference velocity; and a driving unit that drives the light beam unit to produce the at least one light beam with the calculated intensity.

* * * * *